UNITED STATES PATENT OFFICE.

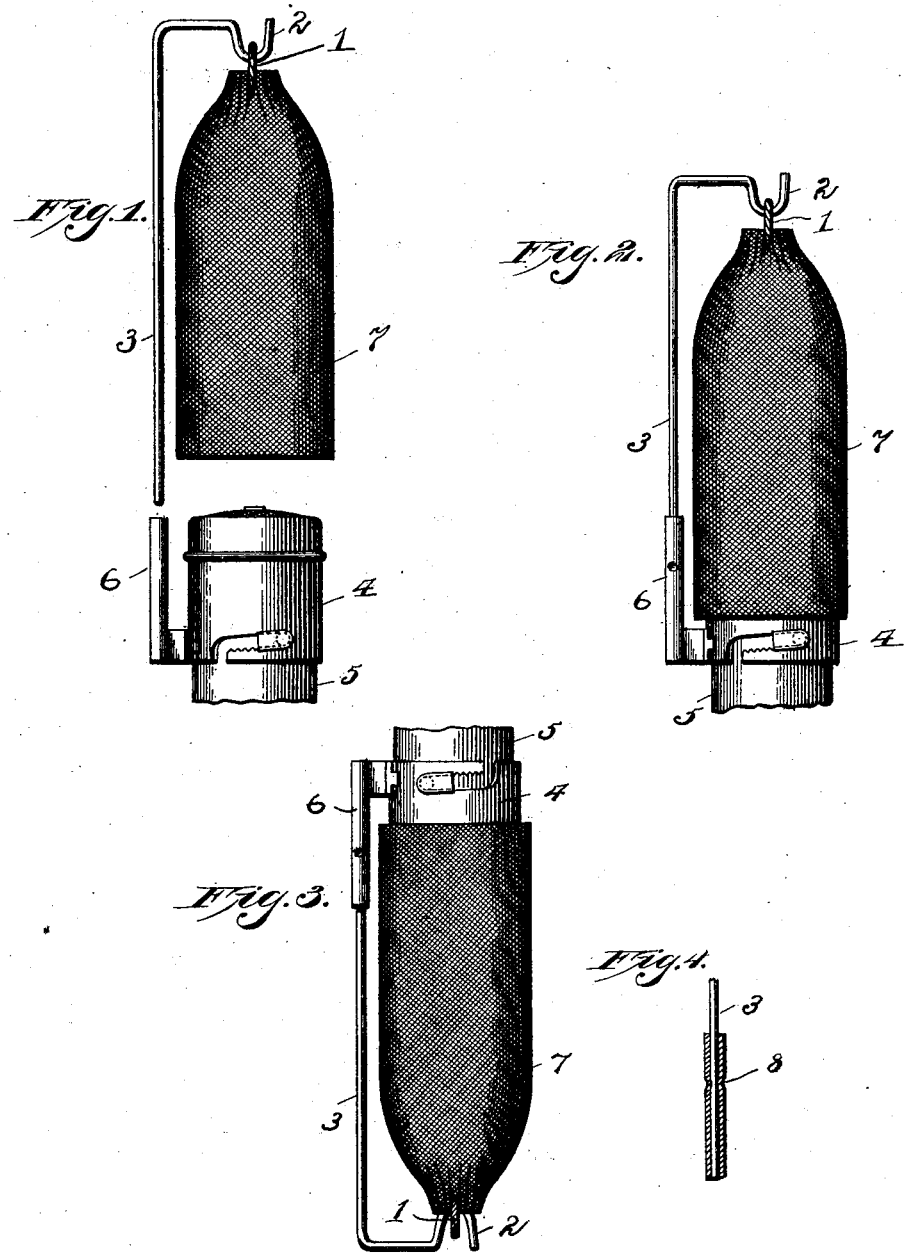

JOHN FREDERIC W. JOST, OF PHILADELPHIA, PENNSYLVANIA, ASSIGNOR TO WELSBACH LIGHT COMPANY, OF GLOUCESTER CITY, NEW JERSEY, A CORPORATION OF NEW JERSEY.

MANTLE-SUPPORT.

SPECIFICATION forming part of Letters Patent No. 696,178, dated March 25, 1902.

Application filed August 12, 1901. Serial No. 71,722. (No model.)

*To all whom it may concern:*

Be it known that I, JOHN FREDERIC W. JOST, a citizen of the United States, residing at Philadelphia, in the county of Philadelphia and State of Pennsylvania, have invented certain new and useful Improvements in Mantle-Supports, of which the following is a specification.

A cord, as of asbestos, run through the top of a mantle and tied so as to form a bail is one of the cheapest ways of providing for suspending the mantle. To provide a carrier consisting of a side support connected with the top of the mantle and of a collar adapted to the burner-head has been advantageous, because it permits of the ready application of mantles by persons unskilled. However, heretofore the attachment of mantles with bails to the side supports of carriers in such a way that the mantles would not come off when the outfit was shipped presented difficulties. Solutions for these difficulties have been suggested; but they were for the most part expensive and cumbersome and involved the use of an unnecessary amount of wire for the duplication of side supports.

It is the object of this invention to obviate these defects and difficulties and to provide for attaching the asbestos or other bail of a mantle to the simple hook of the side support of a carrier in such a way that little or no expense is involved and that the complete carrier and mantle can be shipped without danger of accidental detachment of the mantle.

To these and other ends hereinafter set forth the invention, stated in general terms, comprises the combination of a mantle provided with a bail, a collar provided with a socket, and a side support provided with a hook and adapted to be set down into the socket and secured, the construction and arrangement of the parts being such that when the side support is secured in its socket the length of the hook exceeds the length of the bail, while at the same time the length of the mantle exceeds the distance between the top of the collar and the bottom of the hook.

The nature, characteristic features, and scope of the invention will be more fully understood from the following description, taken in connection with the accompanying drawings, forming part hereof, and in which—

Figure 1 is a view illustrating a device embodying the invention and showing the parts detached. Fig. 2 is a view illustrating the parts of the device assembled. Fig. 3 is a view of the device turned upside down in order to illustrate how it is that the mantle may not be detached, and Fig. 4 is a view of a detail.

In the drawings, 1 is the bail of the mantle. The bail is formed in the ordinary or in any preferred manner by, for example, running a cord through the top of the mantle and tying the ends of the cord so as to form the bail across the top of the mantle.

2 is a hook on the end of the side support 3. The hook is of the simplest construction and exceeds in depth the length of the bail for a purpose to be presently described.

4 is a collar which is adapted to the burner-head 5. The collar itself is provided with a socket or holder 6.

The parts 2, 3, 4, and 6 make up what may be called the "mantle-carrier" and, together with the mantle 7, constitute a complete device which is shipped and applied by customers to their burner-heads. The distance in the complete device between the top of the collar 4 and the bottom of the hook 2 is less than the length of the mantle, and the height of the bail is less than that of the hook 2, so that when the bail is free of the top of the hook the lower part of the hook engages the hole in the head of the mantle, and the mantle cannot become detached from the mantle-carrier even though the mantle is turned upside down, as shown in Fig. 3, and vibrated or shaken. It will of course be borne in mind that the mantles when shipped are coated, so that they are comparatively stiff and strong. In assembling the parts the skirt of the mantle is passed over the top of the collar, and the side support 3 is passed into its holder until the distance between the bottom of the hook 2 and the top of the collar is less than the length of the mantle, whereupon the side support 3 and the holder 6 are secured together, for example, as shown at 8 in Fig. 4. It may be remarked that when the device has once been assembled it is impossible to take the mantle off without breaking it or to apply another mantle without breaking the carrier. This is advantageous, because it is undesirable that it should be possible for any one to acquire old mantle-carriers, perhaps made by popular manufacturers, and fit them up with their own mantles, which may not be so popular.

It will be obvious to those skilled in the art to which the invention relates that modifications may be made in details without departing from the spirit thereof. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. The combination of a mantle-carrier consisting of a collar and a side support provided with a hook substantially as described and permanently secured to the collar, and a mantle provided with a bail engaging the hook substantially as described and a skirt encircling the collar below its top and exceeding in length the distance between the top of the collar and the bend of the hook, the height of the bail being less than that of the hook.

2. In combination a collar provided with a socket, a side support provided with a hook and adapted for insertion into the socket, a mantle provided with a bail for the hook and having its skirt arranged below the top of the collar, and exceeding in length the distance between the top of the collar and the bottom of the hook, the height of the bail being less than that of the hook, substantially as described.

3. In combination, a collar provided with a socket, a side support provided with a hook and adapted for insertion into the socket, a mantle provided with a bail for the hook and having its skirt arranged below the top of the collar, the height of said bail being less than that of the hook, and the arrangement of the side support in respect to its socket being such as to make the distance between the top of the collar and the bottom of the hook less than the length of the mantle, whereby an attempt to remove the mantle or to supply a new one will result in destroying the mantle or its support, substantially as described.

In testimony whereof I have hereunto signed my name.

JOHN FREDERIC W. JOST.

In presence of—
CHAS. ROGERS, Jr.,
JAS. A. RICHMOND.